United States Patent
Wang et al.

(10) Patent No.: US 8,154,669 B2
(45) Date of Patent: Apr. 10, 2012

(54) ILLUMINATION SYSTEM AND TELEVISION USING THE SAME

(75) Inventors: Chun-Wei Wang, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 1017 days.

(21) Appl. No.: 12/110,573

(22) Filed: Apr. 28, 2008

(65) Prior Publication Data

US 2009/0161030 A1 Jun. 25, 2009

(30) Foreign Application Priority Data

Dec. 21, 2007 (CN) .......................... 2007 1 0203322

(51) Int. Cl.
*H04N 5/70* (2006.01)
*H04N 9/30* (2006.01)

(52) U.S. Cl. ....................................... 348/801; 348/802
(58) Field of Classification Search .................. 348/552, 348/801, 802
See application file for complete search history.

(56) References Cited

U.S. PATENT DOCUMENTS

| | | | |
|---|---|---|---|
| 6,295,098 B1 * | 9/2001 | Motonakano et al. | 348/675 |
| 6,611,297 B1 * | 8/2003 | Akashi et al. | 348/739 |
| 6,879,326 B1 | 4/2005 | Herman | |
| 7,164,440 B2 * | 1/2007 | Cannon | 348/229.1 |
| 7,377,657 B2 * | 5/2008 | Morejon et al. | 353/85 |
| 2004/0175014 A1 * | 9/2004 | Liu | 381/386 |
| 2005/0210517 A1 * | 9/2005 | Hirose et al. | 725/81 |
| 2006/0098077 A1 * | 5/2006 | Dowling | 347/130 |
| 2006/0126028 A1 * | 6/2006 | Ullman | 353/69 |
| 2006/0131505 A1 * | 6/2006 | Kerr et al. | 250/370.01 |
| 2007/0126932 A1 * | 6/2007 | Bhat et al. | 348/578 |
| 2007/0139515 A1 * | 6/2007 | Du Breuil | 348/14.01 |
| 2008/0129662 A1 * | 6/2008 | Yoo et al. | 345/84 |
| 2008/0297591 A1 * | 12/2008 | Aarts et al. | 348/51 |
| 2009/0167942 A1 * | 7/2009 | Hoogenstraaten et al. | 348/500 |
| 2009/0256962 A1 * | 10/2009 | Iwanami et al. | 348/552 |
| 2010/0005062 A1 * | 1/2010 | Van Den Dungen | 707/3 |
| 2010/0026206 A1 * | 2/2010 | Sekulovski et al. | 315/294 |
| 2010/0061080 A1 * | 3/2010 | Salters et al. | 362/97.1 |
| 2010/0097408 A1 * | 4/2010 | Marcellinus et al. | 345/690 |
| 2010/0177247 A1 * | 7/2010 | Sekulovski et al. | 348/602 |

FOREIGN PATENT DOCUMENTS

CN 2443229 Y 8/2001

(Continued)

*Primary Examiner* — Brian Pendleton
*Assistant Examiner* — Jonathan V Lewis
(74) *Attorney, Agent, or Firm* — Altis Law Group, Inc.

(57) ABSTRACT

A system includes a light source, a driving module and a processing unit. The light source includes a red, green and blue light emitting diodes. The driving module is electrically coupled to the red, green and blue light emitting diodes. The driving module is for controlling a driving current outputted to each of the red, green and blue light emitting diodes. The processing unit is communicatively coupled to the driving module. The processing unit receives a video signal containing display information which is inputted into a display screen and is to be displayed thereon. The processing unit analyzes the video signal and determines color temperature of the display information, and outputs a first controlling signal to the driving module for synchronously adjusting the color temperature of the light emitted from the light source to be substantially equal to that of the display information displayed on the display screen.

8 Claims, 6 Drawing Sheets

FOREIGN PATENT DOCUMENTS

| | | |
|---|---|---|
| CN | 1457416 A | 11/2003 |
| CN | 1607884 A | 4/2005 |
| CN | 1855218 A | 11/2006 |
| TW | M241916 | 8/2004 |
| TW | I280054 | 4/2007 |
| WO | WO 2005062608 A2 * | 7/2005 |
| WO | WO 2005069638 A1 * | 7/2005 |
| WO | 2006135214 A1 | 12/2006 |

* cited by examiner

ILLUMINATION SYSTEM AND TELEVISION USING THE SAME

BACKGROUND

1. Technical Field

The present invention generally relates to illumination systems, and particularly to a system for illuminating, for example, a television background wall using light emitting diodes (LEDs) and a television having the same.

2. Description of Related Art

At present, light emitting diodes (LEDs) are widely used due to high brightness, wide color gamut and rapid response speed. With the rapid development of decorative illuminations for both commercial and residential, the demand for using LEDs in illumination system for decorative illumination is ever increasing.

It is important for the decorative illumination to have a sufficient light energy in a correct color temperature since the color temperature affects the sensation of user's eyes. Thus, there is a need for an illumination system which can emit light with an adjustable color temperature.

SUMMARY

The present invention relates to a system for illuminating portions of a background wall around a periphery of a display screen. According to an exemplary embodiment of the present invention, the system includes a light source, a driving module and a processing unit. The light source includes a red light emitting diode, a green light emitting diode and a blue light emitting diode. The light source is configured for emitting light from the red, green and blue light emitting diodes to illuminate portions of a background wall around the periphery of the display screen. The driving module is electrically coupled to the red, green and blue light emitting diodes. The driving module is configured for controlling a driving current outputted to each of the red, green and blue light emitting diodes thereby adjusting color temperature of the light emitted from the light source. The processing unit is communicatively coupled to the driving module. The processing unit is configured for receiving a video signal containing display information which is inputted into the display screen and is to be displayed thereon. The processing unit is configured for analyzing the video signal and determines color temperature of the display information displayed on the display screen, and outputs a first controlling signal to the driving module for synchronously adjusting the color temperature of the light emitted from the light source to be substantially equal to that of the display information displayed on the display screen.

Other advantages and novel features of the present invention will become more apparent from the following detailed description of exemplary embodiment when taken in conjunction with the accompanying drawings.

DETAILED DESCRIPTION OF THE EMBODIMENT

Reference will now be made to the drawings to describe the various present embodiments in detail.

Figure 1:
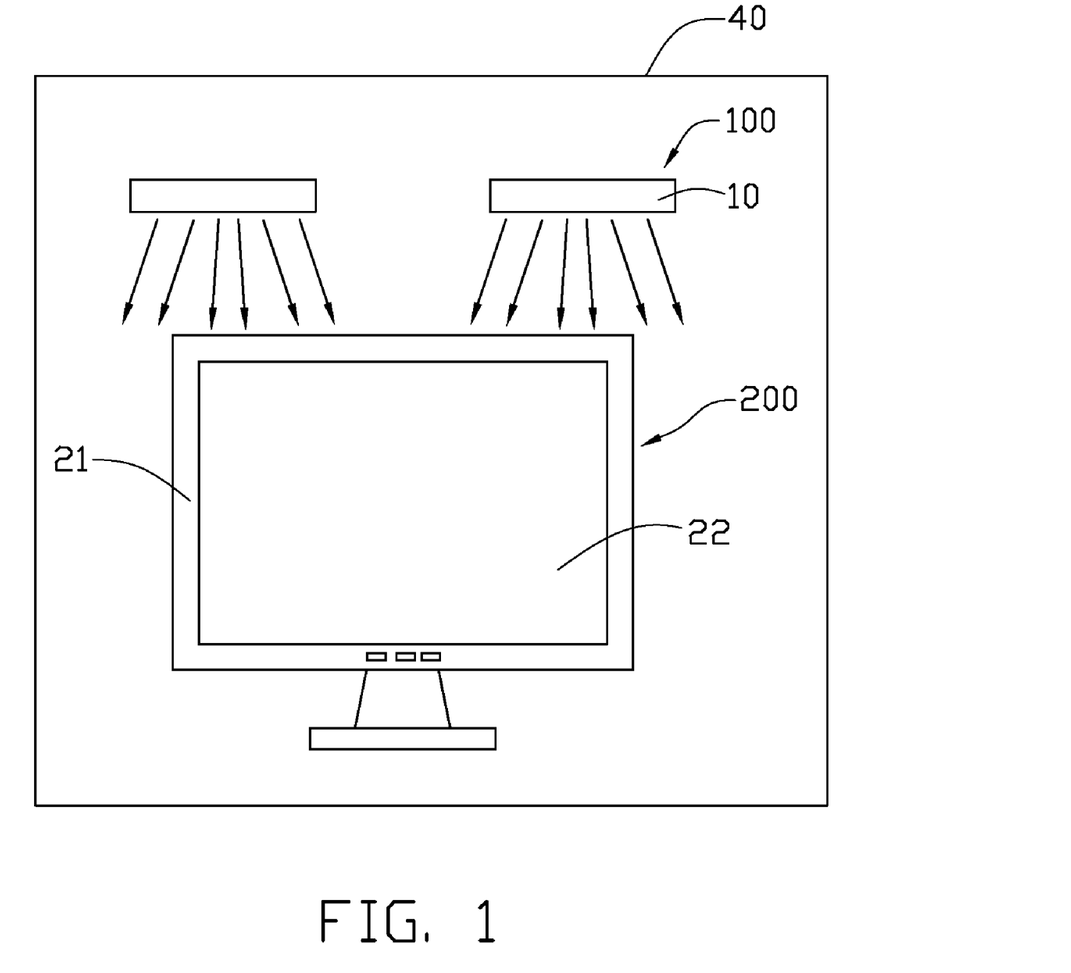
FIG. 1 a schematic view showing a television using an illumination system in accordance with an exemplary embodiment of the present invention.
Figure 2:
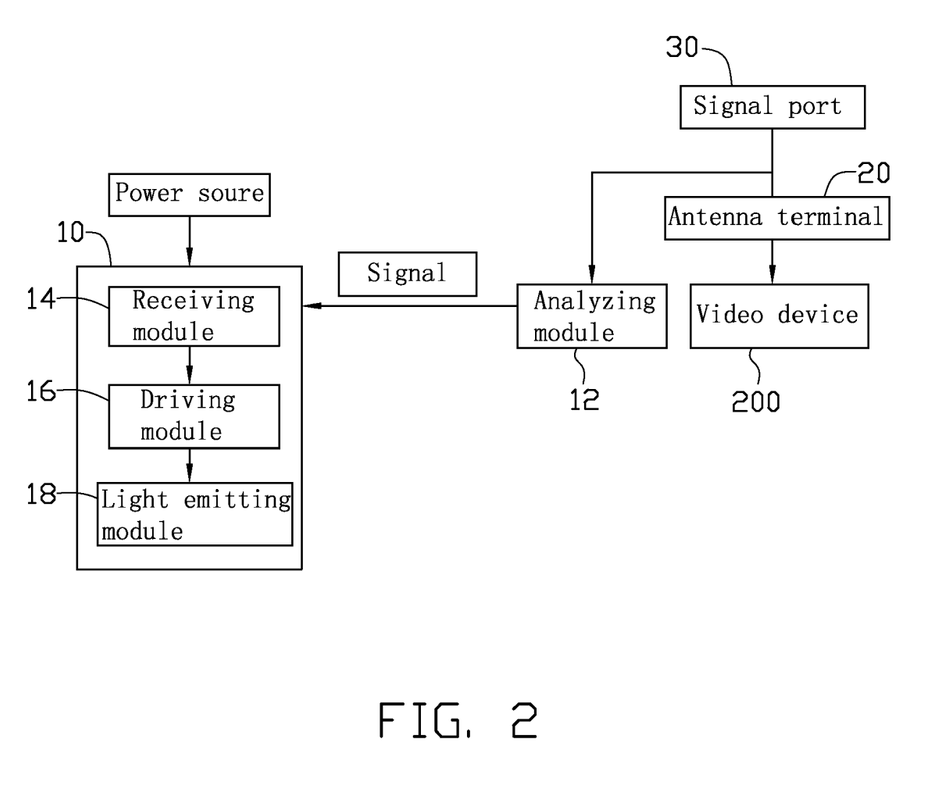
FIG. 2 is a block diagram showing a working principle of the illumination system of FIG. 1.

Referring to FIGS. 1-2, an illumination system 100 according to a first exemplary embodiment of the present invention is shown. The illumination system 100 is used to illuminate corresponding to a video device 200, such as a television, a personal computer, or a projector. The video device 200 includes an antenna terminal 20, a display screen 21 mounted on a background wall and a loudspeaker (not shown). The antenna terminal 20 is for receiving a video signal containing display information and an audio signal containing sound information from a signal port 30. The display screen 21 is for displaying an image 22 corresponding to the video signal. The loudspeaker is for generating a sound corresponding to the audio signal. The illumination system 100 illuminates portions of the background wall around a periphery of the display screen 21 corresponding to the image 22 and the sound of the video device 200. The illumination system 100 includes two illumination devices 10 and an analyzing module 12. The two illumination devices 10 are located above and positioned on a left side and a right side of the video device 200.

During operation, the analyzing module 12 and the video device 200 receive the video signal and the audio signal from the signal port 30 simultaneously. The video device 200 receives the video signal and the audio signal, and generates the sound through its loudspeaker and displays the image 22 on the display screen 21. Meanwhile, the analyzing module 12 processes the video signal and the audio signal, and then outputs a first controlling signal corresponding to the video signal and a second controlling signal corresponding to the audio signal, both of which are received by each of the illumination devices 10. The first controlling signal from the analyzing module 12 controls an intensity of the light emitted from the illumination device 10, and the second controlling signal from the analyzing module 12 controls a flickering frequency of the light emitted from the illumination device 10. The illumination system 100 can adjust a color temperature and a flickering frequency of the light emitted from the illumination device 10 according to changes of a light intensity of the image 22 displayed on the display screen 21 and a sound intensity of the sound generated by the loudspeaker of the video device 200.

Referring to FIG. 2, each of the illumination devices 10 includes a light emitting module 18, a driving module 16 and a receiving module 14.

Figure 3:
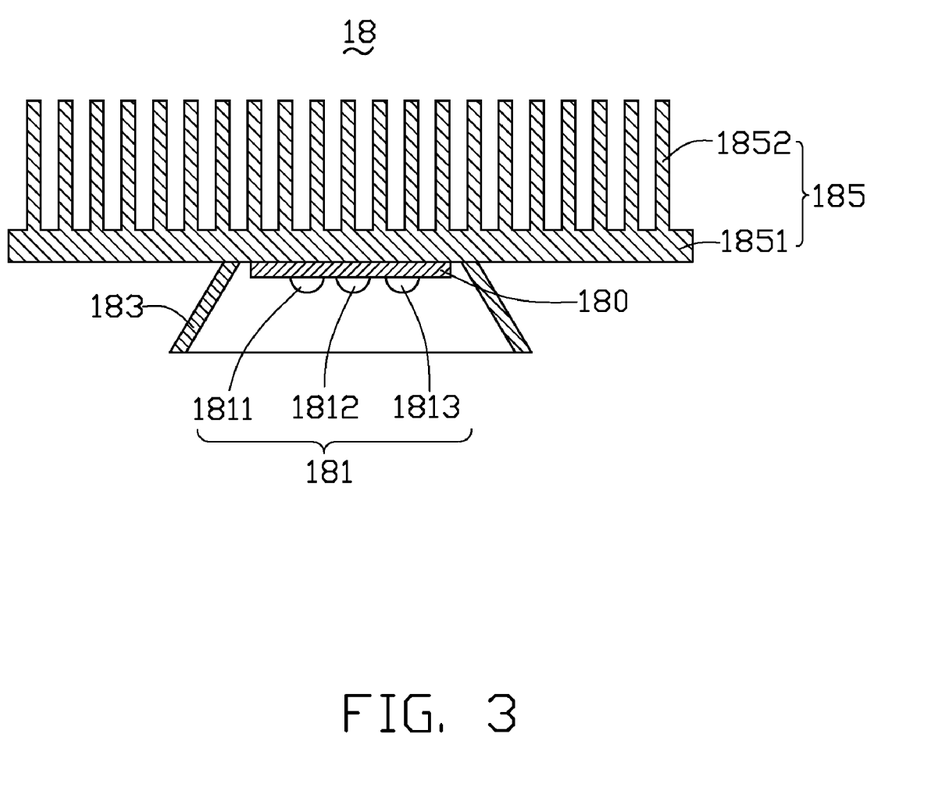
FIG. 3 is a schematic, cross-sectional view of the light emitting module of FIG. 2.

Referring to FIG. 3, the light emitting module 18 includes a printed circuit board 180, a light source 181 electrically connected to the printed circuit board 180, a lampshade 183 and a heat sink 185. The heat sink 185 includes a base 1851 and a plurality of heat dissipation fins 1852 extending upwardly from a top surface of the base 1851. The lampshade 183 is located under the base 1851 of the heat sink 185. The light source 181 includes a red LED 1811, a green LED 1812 and a blue LED 1813. The light source 181 and the printed circuit board 180 are received in the lampshade 183 and are thermally connected to a bottom surface of the base 1851 of the heat sink 185. The lampshade 183 is made of a high thermally conductive material, such as aluminum, copper and the alike. The lampshade 183 not only can reflect light; it can also function as a heat dissipation element for dissipating heat generated from the light source 181.

The receiving module 14 includes a sensor (not shown). The receiving module 14 receives the first controlling signal and the second controlling signal from the analyzing module 12 through wireless communication, such as infrared transmission or bluetooth transmission, and then transmits the first controlling signal and the second controlling signal to the driving module 16. Alternatively, the driving module 16 can receive the first and second controlling signals from the analyzing module 12 through wire transmission directly, such as universal serial bus (USB) transmission or 1394 bus transmission. Under this condition, the sensor of the receiving module 14 can be accordingly omitted.

The driving module 16 includes an LED driving circuit (not shown). In the present embodiment, the driving module 16 is electrically connected between the receiving module 14 and the light emitting module 18. The driving module 16 receives the first controlling signal and the second controlling signal from the analyzing module 12 through the receiving module 14, and outputs a driving current to each of the red LED 1811, the green LED 1812 and the blue LED 1813. Each of the driving current has a corresponding intensity in response to the received first controlling signal of the analyzing module 12 to adjust the color temperature of the light emitted from the light source 181, and a corresponding frequency in response to the received second controlling signals of the analyzing module 12 to adjust the flicking frequency of the light emitted from the light source 181. Usually, the driving circuit of the driving module 16 is integrated on the printed circuit broad 180 for reducing a volume of the illumination device 10. Alternatively, the driving module 16 and the printed circuit broad 180 can be formed separately.

Figure 4:
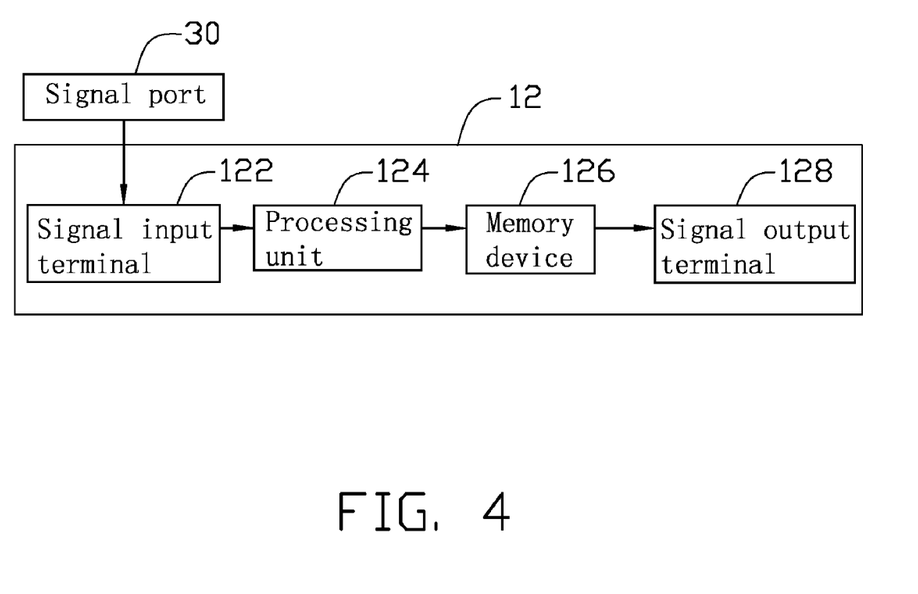
FIG. 4 is a block diagram showing a working principle of the analyzing module of FIG. 2.

Referring to FIG. 4, the analyzing module 12 includes a signal input terminal 122, a processing unit 124, a memory device 126 and a signal output terminal 128.

Figure 5:
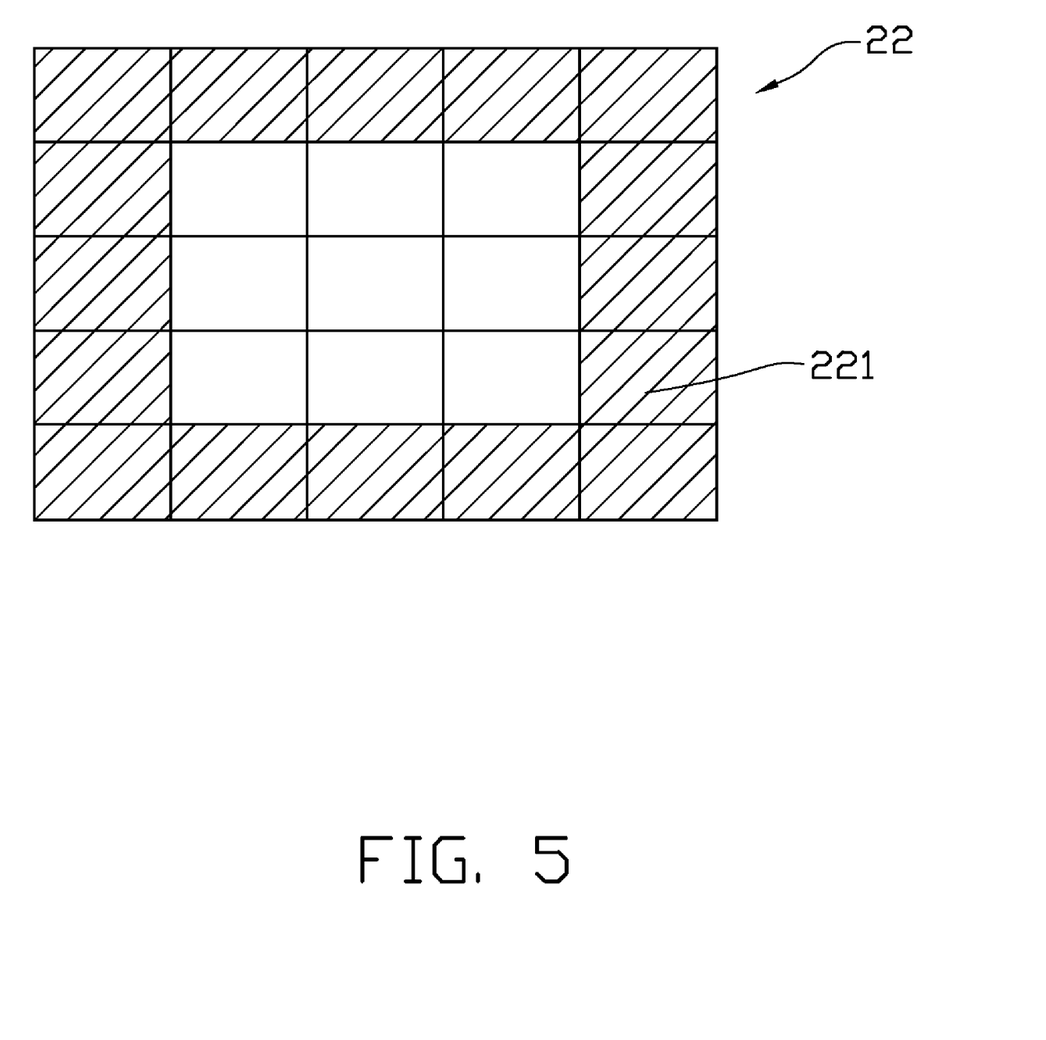
FIG. 5 is a schematic view of an image presented by a display screen of the video device of FIG. 2.
Figure 6:
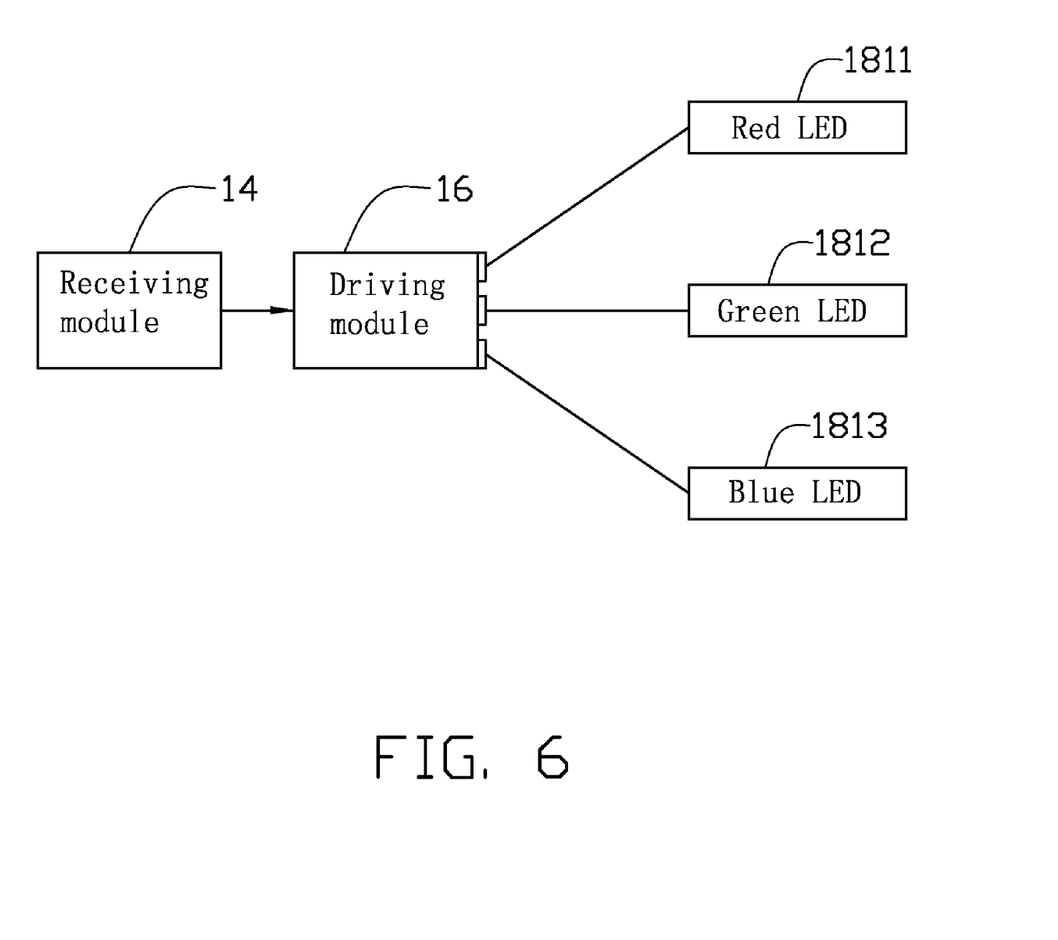
FIG. 6 is a block diagram showing a working principle of the light emitting module of FIG. 2.

The signal input terminal 122 of the analyzing module 12 is electrically connected to the signal port 30 of the video device 200. The analyzing module 12 receives the video signal and the audio signal from the signal port 30 through the signal input terminal 122 thereof. The processing unit 124 records the RGB values of pixel points from a periphery portion 221 of the image 22 of the video device 200 in the received video signal, and identifies a sound intensity value of the sound from the loudspeaker of the video device 200 in the received audio signal. Referring to FIG. 5, the image 22 displayed on the display screen 21 of the video device 200 is divided into twenty five equal grids, and the sixteen grids adjacent to four sides of the image 22 are defined as the periphery portion 221 of the image 22. Alternatively, the number of grids divided by the image 22 can be varied in different embodiments. For example, if the image 22 displayed on the display screen 21 of the video device 200 is divided into thirty grids equally, then the eighteen grids adjacent to four sides of the image 22 will be defined as the periphery portion 221 of the image 22.

The memory device 126 stores a first mapping between the color temperature of the display information and the intensity of the lights emitted from the red LED 1811, the green LED 1812 and the blue LED 1813, and stores a second mapping between the sound intensity of the sound information and the flicking frequency of the red LED 1811, the green LED 1812 and the blue LED 1813. More specifically, the memory device 126 contains a plurality of first comparing values and a plurality of second comparing values therein. The first comparing values are compared with the RGB values of the selected pixel points of the image 22, and according to a comparing result, the analyzing module 12 outputs the first controlling signal to the driving module 16 to control the intensity of the current outputted to each of the red LED 1811, green LED 1812 and blue LED 1813, thereby adjusting color temperature of the lights emitted from the light source 181. The second comparing values are compared with the sound intensity values of the sound from the loudspeaker, and according to a comparing result, the analyzing module 12 outputs the second controlling signal to the driving module 16 to control the frequency of the current outputted to each of the red LED 1811, green LED 1812 and blue LED 1813, thereby adjusting flicker frequency of the lights emitted from the light source 181. The first controlling signal and the second controlling signal are outputted to each of the red LED 1811, green LED 1812 and blue LED 1813 through the signal output terminal 128 thereof.

The working principle of the illumination system 100 will hereinafter be explained in a greater detail. For example, a storm scene with rains and thunders as the image 22 is displayed on the display screen 21 of the video device 200. The video device 200 receives the video signal and the audio signal from the signal port 30. The analyzing module 12 receives the video signal and the audio signal from the signal port 30 synchronously with the video device 200. The processing unit 122 records the RGB values of the pixel points from the periphery portion 221 of the storm scene image 22 according to the video signal, and obtains an average value of the selected RGB values of the pixel points, and identify the sound intensity value of the thunder according to the audio signal. Then, the processing unit 122 compares the average value of these RGB values with the first comparing values in the memory device 126, and compares the sound intensity value of the thunder with the second comparing values in the memory device 126. The signal output terminal 128 then outputs the first controlling signal, which corresponds to the RGB values of the selected pixel points due to the first mapping stored therein, and the second controlling signal, which corresponds to the sound intensity value of the thunder due to the second mapping stored therein, according to the above comparing results.

The receiving module 14 receives the first controlling signal and the second controlling signal from the analyzing module 12 by wireless communication, and then transmits the first controlling signal and the second controlling signal to the driving module 16. The driving module 16 outputs the corresponding driving current, which has the corresponding intensity and frequency to the first controlling signal and the second controlling signal, to each of the red LED 1811, the green LED 1812 and the blue LED 1813. Therefore, each of the red LED 1811, the green LED 1812 and the blue LED 1813 is controlled by the corresponding driving current supplied by the driving module 16 and emits a light to mix with each other. The light emitted from the red LED 1811, the green LED 1812 and the blue LED 1813 has a predetermined intensity and flickering frequency according to the corresponding driving current inputted thereto. Resultantly, the color temperature of the mixed lights of the red LED 1811, the green LED 1812 and the blue LED 1813 substantially mates with the storm scene image displayed on the display screen 21 of the video device 200. The flickering frequency of the mixed lights of the red LED 1811, the green LED 1812 and the blue LED 1813 matches with the sound intensity of the thunder generated from the loudspeaker of the video device 200. That is, the lights of light emitting modules 10 of the illumination system 100 can have a changing color temperature according to the image 22 presented on the display screen 21 of the video device 200 and a changing flicking rate according to the sound intensity of the loudspeaker of the video device 200, which enhance the visualization effect of the image 22.

The light intensity and the flickering frequency of the light emitted from each of the red LED 1811, the green LED 1812 and the blue LED 1813 can be changed rapidly by adjusting the intensity and the frequency of the driving current applied thereto. Thus, the lights of the illumination system 100 can simultaneously change with the image 22 displayed on the display screen 21 and the sound generated from the loudspeaker of the video device 200.

It is to be understood that, the red LED 1811, the green LED 1812 and the blue LED 1813 of the light source 181 can be substituted by other light emitting elements. Each of the light sources 181 may include at least one light emitting element which can emit a red light, at least one light emitting element which can emit a green light, and at least one light emitting element which can emit a blue light. For example, the light source 181 may include a first blue LED, a second LED having a blue LED chip and a green fluorescence material, and a third LED having a blue LED chip and a red fluorescence material; or the light source 181 may include a first LED having a ultraviolet LED chip and a blue fluorescence material, a second LED having a ultraviolet LED chip and a green fluorescence material, and a third LED having a ultraviolet LED chip and a red fluorescence material. The number of the red light emitting elements, the green light emitting elements and the blue light emitting elements of the light source 181 can be more than one. The number of the light source 181 of the light emitting module 18 can also be varied according to application needs of the illumination system 100.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for illuminating portions of a background wall around a periphery of a display screen; the system comprising:
   a light source comprising a red light emitting diode, a green light emitting diode and a blue light emitting diode, the light source configured for emitting light from the red, green and blue light emitting diodes to illuminate portions of the background wall around a periphery of the display screen;
   a driving module electrically coupled to the red, green and blue light emitting diodes, the driving module configured for controlling a driving current outputted to each of the red, green and blue light emitting diodes thereby adjusting color temperature of the light emitted from the light source;
   a processing unit communicatively coupled to the driving module, the processing unit configured for receiving a video signal containing display information which is inputted into the display screen and is to be displayed thereon, the processing unit configured for analyzing the video signal and determining color temperature of the display information displayed on the display screen, and outputting a first controlling signal to the driving module for synchronously adjusting the color temperature of the light emitted from the light source to be substantially equal to that of the display information displayed on the display screen, the processing unit being configured for receiving an audio signal containing sound information, the driving module being configured for controlling flickering frequency of the red, green and blue light emitting diodes, and the processing unit being configured for analyzing the audio signal, determining the sound intensity of the sound information and outputting a second controlling signal to the driving module for synchronously adjusting the flickering frequency of the red, green and blue light emitting diodes according to the sound intensity of the sound information; and
   a memory device for storing the mapping between the sound intensity of the sound information and the flicking frequency of the red, green and blue light emitting diodes.

2. The illumination system of claim 1, wherein the memory device is also for storing the mapping between the color temperature of the display information and the color temperature of the light emitted from the light source.

3. The illumination system of claim 1, further comprising a receiving module for receiving and transmitting the first controlling signal to the driving module.

4. The illumination system of claim 3, wherein the receiving module receives the first controlling signal and transmits the first controlling signal to the driving module through wireless communication.

5. The illumination system of claim 3, wherein the receiving module receives and transmits the first controlling signal to the driving module through wire communication.

6. A television comprising:
   a display screen for mounting on a background wall;
   a light source comprising a red light emitting diode, a green light emitting diode and a blue light emitting diode, the light source configured for emitting light from the red, green and blue light emitting diodes to illuminate portions of the background wall around a periphery of the display screen;
   an antenna terminal for receiving a video signal containing display information, the display screen configured for displaying the display information thereon;
   a driving module electrically coupled to the red, green and blue light emitting diodes and configured for controlling a driving current outputted to each of the red, green and blue light emitting diodes thereby adjusting color temperature of the light emitted from the light source; and
   a processing unit communicatively coupled to the driving module, the processing unit configured for analyzing the video signal and determining color temperature of the display information displayed on the display screen, and outputting a first controlling signal to the driving module for synchronously adjusting the color temperature of the light emitted from the light source to be substantially equal to that of the display information displayed on the display screen;
   wherein the antenna terminal is configured for receiving an audio signal containing sound information, the driving module is configured for controlling flickering frequency of the red, green and blue light emitting diodes, and the processing unit is configured for analyzing the audio signal, determining the sound intensity of the sound information and outputting a second controlling signal to the driving module for synchronously adjusting the flickering frequency of the red, green and blue light emitting diodes according to the sound intensity of the sound information; and wherein the television further comprises a memory device for storing the mapping between the sound intensity of the sound information and the flicking frequency of the red, green and blue light emitting diodes.

7. The television of claim 6, wherein the memory device is also for storing the mapping between the color temperature of the display information and the intensity of the lights emitted from the red, green and blue light emitting diodes.

8. The television of claim 6, further comprising a receiving module for receiving and transmitting the first controlling signal to the driving module.

\* \* \* \* \*